(No Model.) 2 Sheets—Sheet 1.
D. W. CURTIS.
BUTTER WORKER.
No. 501,993. Patented July 25, 1893.
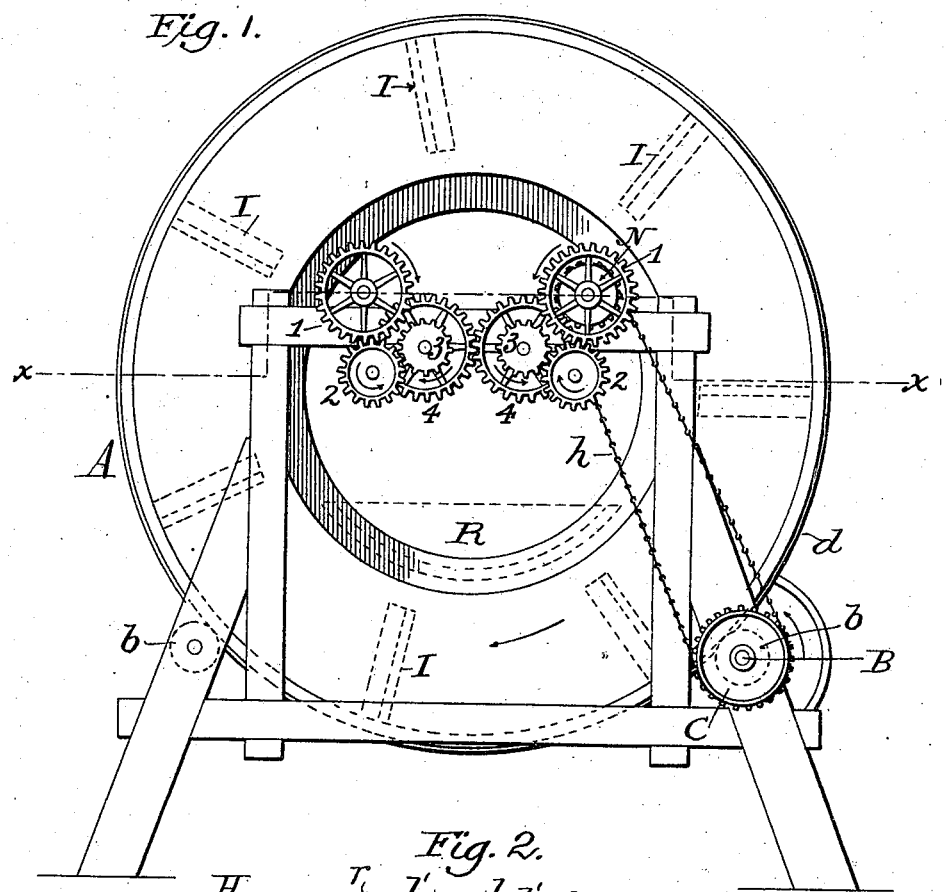
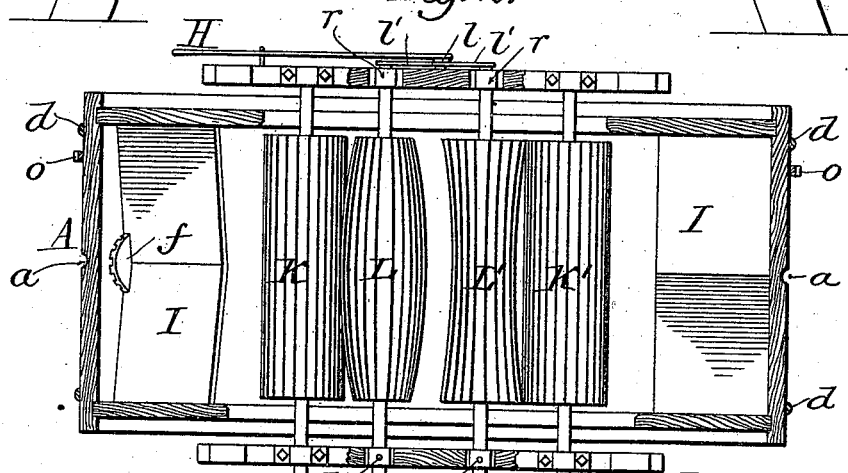
Witnesses:
James F. Duhamel
Horace A. Dodge
Inventor:
D. W. Curtis
by Dodge & Sons
Attys.

(No Model.) 2 Sheets—Sheet 2.
D. W. CURTIS.
BUTTER WORKER.
No. 501,993. Patented July 25, 1893.
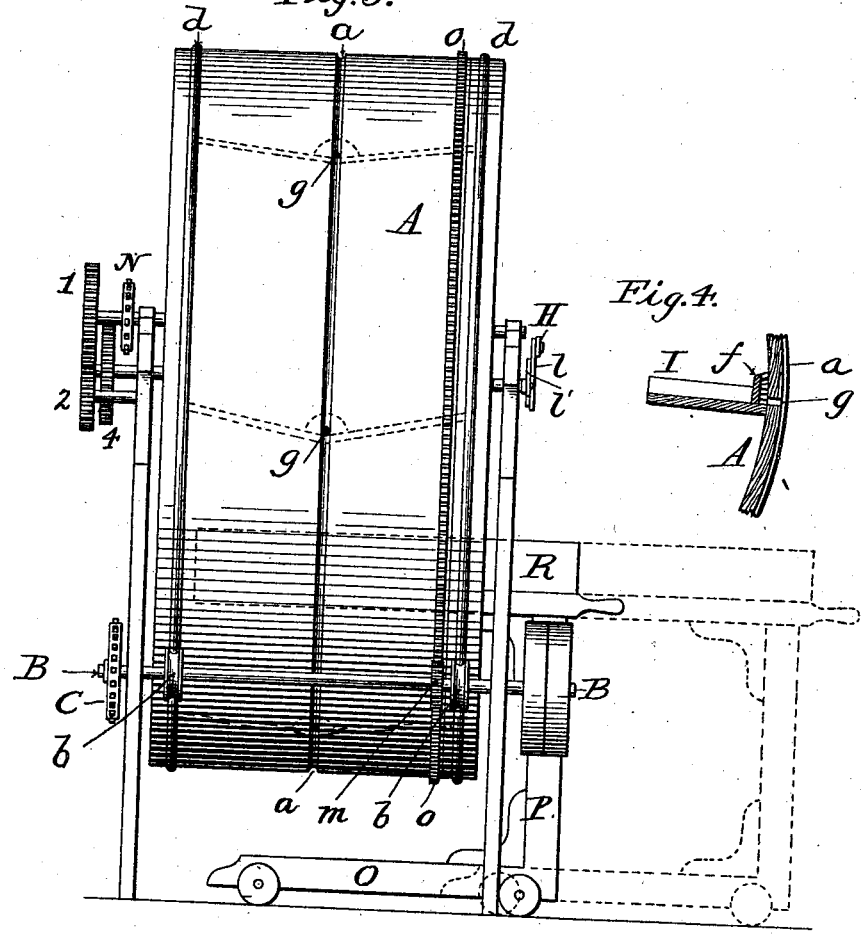
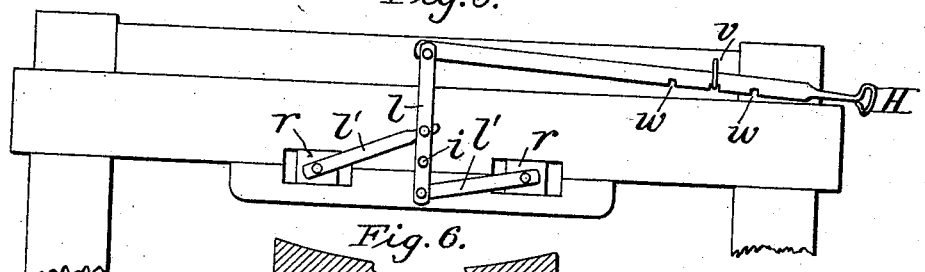
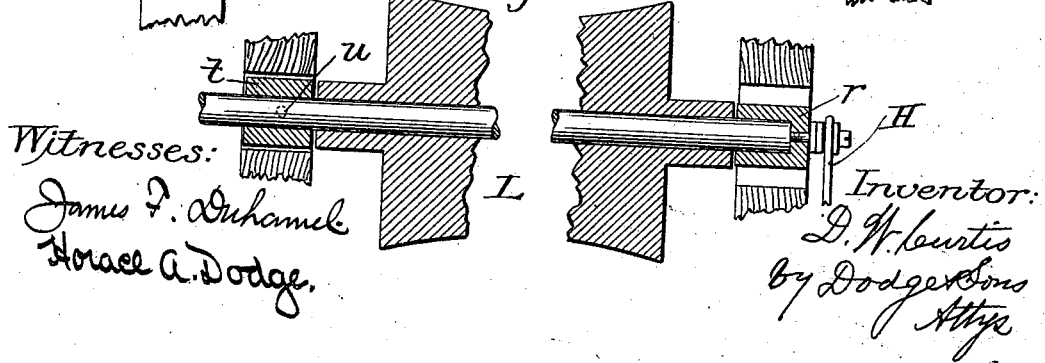
Witnesses:
James F. Duhamel.
Horace A. Dodge.
Inventor:
D. W. Curtis
by Dodge & Sons
Attys

UNITED STATES PATENT OFFICE.

DAVID W. CURTIS, OF FORT ATKINSON, WISCONSIN.

BUTTER-WORKER.

SPECIFICATION forming part of Letters Patent No. 501,993, dated July 25, 1893.

Application filed March 21, 1893. Serial No. 466,978. (No model.)

*To all whom it may concern:*

Be it known that I, DAVID W. CURTIS, a citizen of the United States, residing at Fort Atkinson, in the county of Jefferson and State of Wisconsin, have invented certain new and useful Improvements in Butter-Workers, of which the following is a specification.

This invention relates to butter workers of that class designed for use in factories or creameries for the manufacture of butter on a large scale, and the invention consists in certain features and combinations hereinafter set forth.

Figure 1 is a side elevation showing the mechanism for imparting motion to the parts. Fig. 2 is a transverse section on the line $x$—$x$ of Fig. 1, looking from above downward, and showing the shape and position of the rolls. Fig. 3 is a front elevation, showing the butter carrier in position, and partially out in dotted lines, and Figs. 4, 5 and 6 are portions shown in detail.

The object of this invention is to provide a machine for working out the butter milk, and working in the salt to the butter, as it comes from the churn.

The body of the machine consists of a large drum having a circular opening in each side as shown in Fig. 1, it being mounted in a suitable frame on grooved rollers $b$ as shown in Figs. 1 and 3. It is provided on its exterior with two projecting bands $d$ which fitting in the grooves of the rollers $b$ serve to hold it against lateral movement as it is rotated. Motion is imparted to the drum by means of a pinion $m$ mounted on a shaft B, as shown in Fig. 1, this pinion engaging with a rack $o$ which encircles the drum, this shaft being provided at one end with a fast and a loose pulley adapted to receive a belt from an engine or other motor, and at its opposite end with a sprocket wheel C, from which by means of an endless chain $h$, motion is imparted to the operating rolls hereinafter described.

On its interior the drum is provided with a series of shelves or buckets I, as shown in dotted lines in Fig. 1, these shelves as shown by dotted lines in Fig. 3, and by the full lines in Fig. 2, extending from side to side, and being inclined from each side toward the center, so as to keep or work the butter to the center, and thus insure its delivery at or near the center of the rolls by which it is worked.

In order to permit the escape of the butter milk, a hole $g$ is made through the wall of the drum directly opposite the depression at the center of each shelf I, as shown in Fig. 3; and to prevent these holes from becoming clogged with butter there is placed over each hole on the inside of the drum a concave shield or block $f$, which is provided with notches or openings all around its edge, through which the butter-milk enters the space between it and the wall of the drum, and from whence it flows out through the hole $g$, this arrangement being shown in section in Fig. 4. In order to prevent the butter-milk from spreading laterally on the exterior of the drum, and getting onto the gearing and supporting rolls, a groove or channel $a$ is formed on its exterior in line with the series of holes, so that the butter-milk following this channel will be kept at the center and run off at the bottom into a suitable spout arranged to receive and convey it where desired, or into a vessel set under the drum to receive it.

The rolls for working the butter are arranged transversely within the drum, as shown in Fig. 2, they being mounted in suitable bearings in the frame at the sides of the drum, as shown in Figs. 1, 2 and 3. The working rolls proper are the two central rolls L and L', the former being made convex and the latter concave longitudinally as shown in Fig. 2, for the purpose of drawing the butter to the center, and prevent it from working out at the sides, as it would otherwise tend to do. Just outside of and above these central rolls I arrange at each side another roll K, as shown in Figs. 1 and 2, these latter being straight rolls, and all the rolls being fluted or ribbed as indicated in Fig. 2, and as is customary in butter workers. The function of these two outer rolls is to receive any butter which may fall from the buckets I outside of the center rolls and throw it inward upon the latter, so as to insure its passing between them. In order to do this, all the rolls are made to turn toward the center as indicated by the arrow in Fig. 1.

The rolls K are each provided with a gear wheel 1 which engages with an idler or loose pinion 2, which in turn engages with a gear wheel 3 secured to the journal of the central rolls, the two central rolls being connected by gear wheels 4, all as shown in Fig. 1. On the journal or shaft of the outer roll K on the side next to the main or driving shaft B, is secured a sprocket wheel N over which the chain $h$ passes, from the main shaft, and by which with the gearing above described, motion is imparted simultaneously to all the rolls.

In order to render the two central rolls L and L' adjustable toward and from each other, their journals at one end are mounted in boxes $r$ arranged to slide in mortises in their supporting frame work as shown in Figs. 5 and 6, and at their opposite ends in boxes $t$ provided with pins or journals $u$ above and below, as indicated in Figs. 2 and 6, so that they are free to swivel or turn sufficiently to adjust themselves in line with their respective shafts whenever the sliding boxes are moved in one or the other direction to adjust the rolls.

In order to enable the attendant to adjust the rolls whenever desired and without stopping the machine, I provide a handle or rod H, one end of which is connected to a lever $l$ which is pivoted to the frame on a bolt $i$ midway between the two sliding boxes $r$ as shown in Fig. 6, the boxes $r$ being connected to the lever $l$ by rods $l'$, one above and the other below the pivot $i$ and equidistant therefrom as shown, by which it will be seen that whenever the lever $l$ is moved in one direction the two boxes and their rolls will be moved uniformly apart, and when the lever is moved in the opposite direction they will be moved uniformly nearer together.

In order to lock the rolls in position the handle H is provided on its under side with a series of notches $w$ as shown in Fig. 5, and is passed through a staple $v$ of such a width as to permit the handle to be raised therein and moved to and fro as desired, the notches $w$ serving to engage it with the staple when released, and thus lock the rolls in the position to which they may have been adjusted.

It will be observed that the gearing which connects the rolls is located at the opposite side from the sliding boxes so as not to be thrown out of gear by the adjusting of the rolls, the movement of the rolls at the end where the gearing is, being very slight.

In order to receive and remove the butter after it has been worked, I provide a movable receiver so constructed as to fit within the rotating drum underneath the rolls, and receive the butter as it falls therefrom. This receiver consists of an oblong tray or box R, shown in Fig. 3, and in dotted lines in cross section in Fig. 1. In order to enable it to be run into the opening in the side of the drum and underneath the rolls as shown, this box or tray is supported at its outer end by uprights P, which are rigidly connected at their lower ends to a base or frame O, as shown in Fig. 3: and this base or frame is provided with wheels or casters, so as to enable the receiver as a whole to be moved about as desired, it being provided with handles for that purpose.

The operation is as follows: The butter is taken from the churn one hundred and fifty to two hundred pounds at a time, and dumped into the bottom of the drum through the opening in its side. As the drum rotates the butter is carried up by the buckets, and with the assistance of the outer rolls K and K which rotate at the same speed as the drum, is delivered upon the working or central rolls L L' between which it will pass and which squeeze or work out the butter-milk which escapes through the holes $g$. The proper quantity of salt is sprinkled upon the butter in the drum as the latter is started, and is thoroughly mixed or worked into the butter by the rolls during the operation. As the butter drops from the rolls it is again carried up by the buckets, and thus the operation is continued until the butter milk is worked out and the salt properly worked in, six to eight minutes sufficing to treat two hundred pounds of butter. As soon as the butter has been sufficiently worked, the receiver R is placed in position under the rolls and receives the butter as it falls from the rolls, and when filled is withdrawn and run to the packing room, where the butter is at once transferred to the tubs in which it is packed ready for shipment. By providing two or more of these receivers, it will be seen that when one is filled or partially so, it can be withdrawn and another instantly shoved into position, so that one can be emptied while the other is being filled, and this without stopping the rotation of the drum, as whatever butter may fall from the rolls to the bottom of the drum during this change of the receivers, will be immediately carried up by the buckets and passing through the rolls will be delivered into the second receiver. It will thus be seen that the operation of working and salting the butter is greatly expedited, and that it is effected with the minimum amount of handling the butter after it has been worked, which is a very desirable object, not only on account of the saving in time and labor, but also because as is well known, too much working or handling of the butter tends to destroy its granular structure, and causes it to assume a pasty or waxy condition, alike injurious to its keeping qualities and its flavor.

Although in ordinary cases the machine will be stopped while the butter is being put in, it will be seen that if desired, the butter can be put in and removed without stopping the drum, and thus the operation be made continuous.

I am aware that rotating drums with cleats or shelves have before been used for various purposes, and therefore I make no claim to such broadly, but

What I claim as my invention is—

1. The rotating drum A provided with a series of concave shelves or buckets I, with holes $g$ arranged as shown for the purpose of separating the fluid from the butter and delivering the latter to the rolls, substantially as described.

2. The rotating drum provided with the concave buckets I, the holes $g$, and the groove or channel $a$ on its exterior, substantially as and for the purpose set forth.

3. The rotary drum provided with the concave buckets I, with a hole $g$ and shield $f$, located at the center of the concavity of the buckets, substantially as and for the purpose set forth.

4. In combination with the rotating drum, provided with buckets, the working rolls L, L', and the delivery rolls K, K said rolls all being arranged parallel with the axis of the drum, and in relation to each other, substantially as shown and described.

5. In combination with the rotary drum provided with a series of internal buckets, the two pairs of rolls connected by gearing (or equivalent means) substantially as described, whereby the two rolls on each side of the center are caused to rotate inward toward the center, as shown and described.

6. A tray or receiver, consisting of a base O, provided with casters or wheels, with uprights or supports P secured to said base at or near one end, and the tray or box R secured at one end to the uprights and projecting therefrom in the same direction as the base, whereby the box or tray R can be inserted within the open end of the rotating drum while the base O passes under the drum, substantially as, and for the purpose set forth.

7. The combination in a butter worker, of the rotary drum provided with a series of internal buckets, the working rolls L L' each having their journals at one end mounted in boxes arranged to swivel or turn, and their journals at the opposite end being mounted in sliding boxes, with the pivoted lever $l$ connected by links to the sliding boxes, and the handle H provided with notches for adjusting the working rolls and locking them in position when adjusted, substantially as shown and described.

8. The combination in a butter worker, of the rotary drum provided with a series of internal buckets, the concave and convex working rolls, and the two delivery rolls K and K located outside of and above the working rolls, all of said rolls being arranged parallel with the axis of the drum, substantially as shown and described.

9. In a butter worker, the combination of the drum A provided on its exterior with the projecting bands $d$ and the rack $o$, with the shaft B provided at one end with a fast and loose pulley, at its opposite end with a sprocket wheel C, and with a pinion $m$ arranged to engage with the rack $o$, all arranged for joint operation substantially as shown and described.

In witness whereof I hereunto set my hand in the presence of two witnesses.

DAVID W. CURTIS.

Witnesses:
H. H. CURTIS,
J. M. SMETHURST.